(12) United States Patent
Richter et al.

(10) Patent No.: US 12,340,161 B2
(45) Date of Patent: Jun. 24, 2025

(54) MULTI-LAYER INTEGRATED CIRCUIT ROUTING TOOL

(71) Applicant: INTERNATIONAL BUSINESS MACHINES CORPORATION, Armonk, NY (US)

(72) Inventors: Ralf Richter, Unterhausen (DE); Lukas Daellenbach, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 17/814,855

(22) Filed: Jul. 26, 2022

(65) Prior Publication Data

US 2024/0037311 A1 Feb. 1, 2024

(51) Int. Cl.
*G06F 30/394* (2020.01)
*G06F 30/392* (2020.01)
*G06F 111/04* (2020.01)
*G06F 119/12* (2020.01)

(52) U.S. Cl.
CPC .......... *G06F 30/394* (2020.01); *G06F 30/392* (2020.01); *G06F 2111/04* (2020.01); *G06F 2119/12* (2020.01)

(58) Field of Classification Search
USPC ....................................... 716/130
See application file for complete search history.

(56) References Cited

U.S. PATENT DOCUMENTS

| | | | |
|---|---|---|---|
| 7,107,200 B1* | 9/2006 | Korobkov | G06F 30/367 716/113 |
| 2004/0232445 A1* | 11/2004 | Nakamoto | H01L 23/5226 257/E23.145 |
| 2018/0165239 A1 | 6/2018 | Daellenbach | |
| 2018/0165405 A1 | 6/2018 | Braun | |
| 2019/0163862 A1 | 5/2019 | Beck | |
| 2020/0050730 A1 | 2/2020 | Daellenbach | |
| 2020/0167441 A1 | 5/2020 | Lind | |
| 2024/0037311 A1* | 2/2024 | Richter | G06F 30/394 |

FOREIGN PATENT DOCUMENTS

CN  113901755 A  *  1/2022  ........... G06F 30/392

OTHER PUBLICATIONS

Disclosed Anonymously, "Method and Apparatus for performing timing improvement on nets cross blockage", IP.com No. IPCOM000206923D, Publication date: May 13, 2011, 14 pages.

(Continued)

*Primary Examiner* — Mohammed Alam
(74) *Attorney, Agent, or Firm* — Elliot J. Shine

(57) ABSTRACT

A computer implemented method for a multi-layer integrated circuit routing tool connecting sources with nets to sinks in a hierarchical multi-layer integrated circuit design environment, the method including creating a cycle reach table containing a first set of information parameters for two dimensional nets per metal layer combination, creating a repeater reach table containing a second set of information parameters per constraint class, preparing a working list of nets, preparing a list of blocks larger than repeater reach dimensions, connecting a source pin to a sink pin on preassigned metal layers, by routing the net based on the given constraint class.

23 Claims, 11 Drawing Sheets

(56) References Cited

OTHER PUBLICATIONS

Wikipedia, "Steiner tree problem", https://en.wikipedia.org/wiki/Steiner_tree_problem, Accessed on Jun. 2, 2022, 5 pages.
Wikipedia, "RC time constant", https://en.wikipedia.org/wiki/RC_time_constant, Accessed on Jun. 3, 2022, 2 pages.
Wikipedia, "Signal edge", https://en.wikipedia.org/wiki/Signal_edge, Accessed on Jun. 3, 2022, 1 page.
Hu et al., "Buffer Insertion with Adaptive Blockage Avoidance", ISPD'02, Apr. 7-10, 2002, San Diego, California, USA, Copyright 2002, ACM, pp. 92-97.
Notification of Transmittal of the International Search Report and the Written Opinion of the International Searching Authority, Orthe Declaration, Date of mailing Oct. 23, 2023, Applicant's or agent's file reference P202003940PCT01, International application No. PCT/EP2023/070108, 15 pages.
In response to the written opinion of the International Searching authority dated Feb. 21, 2025, Application No. 23745470.7, 4 pages.

\* cited by examiner

20

| metal layer combination | width | reach (μm) | $\Delta t_{delay}$ (ps/μm) |
|---|---|---|---|
| 1xM1/M2 | 1x | 100 | 100 |
| 1.5xM1/M2 | 1.5xM1/M2 | 150 | 66 |
| 1x M3/M4 | 2xM1/M2 | 200 | 50 |
| 1.5x M3/M4 | 3xM1/M2 | 300 | 33 |
| 1xM5/M6 | 4xM1/M2 | 400 | 25 |
| 1.5x M5/M6 | 6xM1/M2 | 600 | 16.6 |
| 1x M7/M8 | 8xM1/M2 | 800 | 12.5 |
| 1.5x M7/M8 | 12xM1/M2 | 1200 | 8 |

*Figure 3*

| constraint class name | metal layer combination | width | space | repeater reach length (μm) |
|---|---|---|---|---|
| M12W10S10 | 1xM1/M2 | 1x | 1x | 50 |
| M12W15S15 | 1.5xM1/M2 | 1.5xM1/M2 | 1.5x | 75 |
| M34W10S10 | 1x M3/M4 | 2xM1/M2 | 1x | 100 |
| M34W15S15 | 1.5x M3/M4 | 3xM1/M2 | 1.5x | 150 |
| M56W10S10 | 1xM5/M6 | 4xM1/M2 | 1x | 200 |
| M56W15S15 | 1.5x M5/M6 | 6xM1/M2 | 1.5 | 300 |
| M78W10S10 | 1x M7/M8 | 8xM1/M2 | 1.0x | 400 |
| M78W15S15 | 1.5x M7/M8 | 12xM1/M2 | 1.5x | 600 |
| M78W20S20 | 2.0x M7/M8 | 16xM1/M2 | 2.0x | 800 |

MULTI-LAYER INTEGRATED CIRCUIT ROUTING TOOL

The present invention relates in general to a computer implemented method for a multi-layer integrated circuit routing tool connecting sources of nets to sinks in a hierarchical multi-layer integrated circuit design environment. The invention further relates to a data processing system for a multi-layer integrated circuit routing tool connecting sources of nets to sinks in a hierarchical multi-layer integrated circuit design environment, and a computer program product.

BACKGROUND

The current, very complex semiconductor developments use tools, such as electronic design automation (EDA) tools, for development of complex integrated circuit chips. The complexity of the chips is simplified and parallelized by hierarchically dividing the circuits into small blocks. In order to work simultaneously on all these levels, blocks are used as black boxes in the next hierarchical level, and the area, metal layers and levels belonging to this block are protected by appropriate blockages.

The blocks are wired together from the next hierarchical level. In the process, they must be connected to each other, and these connections can also run across a block. A challenge for wiring includes that all timing requirements must be met without overcrowding wiring space. Each block is assigned constraints regarding assigned metal layer and a width and space to be routed through the design. A router then wires nets on the available metal layers. A net consists of wires which are implemented on metal layers and vias connecting the metal layers. Thin wires may be routed over blocks for which the block is too wide, but may not be considered in cases where timings are assumed to be ideal.

The physical properties defined in this way, in particular a resistive-capacitive delay (RC delay), result in requirements for installation of repeaters or inverters and their distances from each other. EDA constraint-tool assumes that the installation of these repeaters is possible everywhere, which does not correspond to reality.

As hierarchical blocks increase in complexity and size these problems are aggravated.

Semiconductor chips use metal layers for wiring circuit parts. The different metal layers can be used for different signal speeds and net lengths. In development, different methods are used to determine on which metal layer a net is routed, based on the timing model or the net length. The timing method considers how much delay time is available to route a net. The net length method assigns short nets to the lower, thinner and thus slower metal layers, which have a higher RC delay, the long nets to the higher, thicker and thus faster metal layers. Both methods assume that it is possible to place a repeater everywhere to refresh the signal.

Neither model consider blockages in the metal layer allocation. The blockages are caused by the hierarchical designs used today. The hierarchical designs divide the chip into larger and smaller blocks such as cores, units, memory, etc., which are then placed. These blocks are interconnected with nets via interfaces that lead between blocks and across blocks.

The blocks are completely or partially blocked for wiring up to a certain metal layer. It is impossible to place inside these blocks the repeaters or inverters which are important for the nets. If metal layers are chosen for nets that are lower or equal to the top blocked layer of the block, these nets must be routed around the block. If thin nets are routed over a block that require a repeater in the area of the block, then this repeater must be placed outside the block, thus extending the net.

SUMMARY

A computer implemented method is proposed for a multi-layer integrated circuit routing tool connecting sources with nets to sinks in a hierarchical multi-layer integrated circuit design environment. The method includes creating a cycle reach table containing a first set of information parameters for two dimensional nets per metal layer combination, creating a repeater reach table containing a second set of information parameters per constraint class, preparing a working list of nets by creating a list of nets with the same constraint class, starting with the first constraint class corresponding to a lowest metal layer combination, extracting and checking blocked areas in a wiring region, preparing a list of blocks larger than repeater reach dimensions by marking all blocks wider in length and width than a repeater reach length, creating blockages over these blocks on the metal layer given by the selected constraint class from the repeater reach table and creating a blockage on all higher metal layers up to the top most metal layer, connecting a source pin to a sink pin on preassigned metal layers by routing the net based on the given constraint class.

Advantageously, the proposed method extends the calculation of the constraint classes to be used by taking into account the dimensions of all instantiated blocks that lie under a mesh, in addition to the given timing model.

Wire constraints are calculated to route wires over instantiated blocks without an intermediate amplifier, or repeater. Starting with the lowest metal layer and the thinnest wire, a metal blockade is placed over all blocks whose dimension is greater than the maximum repeater distance of that wire constraints. After a routing, all nets larger than a Manhattan distance are assigned to the next constraint class, where a Manhattan distance between two points is the sum of the absolute differences of the single coordinates of the points.

In an embodiment of the invention, additionally or alternatively, the method may further include comparing a routed net length with a Steiner net length estimation for all nets being routed around the blockage, calculating a slack on routed nets, removing nets with positive slack from the working list, removing nets with negative slack and net length similar to the Steiner net length, removing the new wire solution for nets longer than the Steiner net length as a minimum length after moving them into the next constraint class, depending on being part of a category of nets with positive slack, for nets with net length longer than the Steiner net length requesting an alternate routing solution based on a changed constraint class by either extending the wire width on the same metal layer based on the next constraint class from the repeater reach table or changing to the next constraint class by switching the wiring metal layer to an upper metal layer, in order to improve the slack for that net, repeating the above steps for each wire constraint class, in particular in N−1 routing sessions, where N is the number of given constraint classes, collecting the constraint results from each of the N routing sessions, running the routing sessions in a parallel approach. A Steiner length describes the shortest possible connection between two points.

The slack of a net is a time difference calculated from a required-arrival-time and an actual-arrival-time for a signal.

Advantageously, before wiring, all blocks instantiated in the floor plan are examined to check if their height or width is greater than a repeater reach of a constraint class. On blocks for which this is true, additional blockages are placed on top so that all metal layers above are blocked. Then, all nets of this constraint class are routed as Steiner nets.

In an embodiment of the invention, additionally or alternatively, further nets of the working list may be prioritized such that nets with a higher complexity will be routed first and nets with a lower complexity will be routed afterwards, in particular wherein the complexity is defined by a number of sink pins in the entire path of the net or by using a wider metal layer width. Advantageously, the efficiency of the proposed method for routing complex geometries may be enhanced.

In an embodiment of the invention, additionally or alternatively, the first set of information parameters for two-dimensional wiring per metal layer combination may include a metal layer combination, a metal layer width, a specific delay time. The second set of information parameters per constraint class may include a constraint class, a metal layer combination, a metal layer width and space, a repeater reach length. The specific delay time is defined as a retardation time per length. Advantageously, information from a cycle reach table as well as from a repeater reach table may be used for routing the nets over blocks.

In an embodiment of the invention, additionally or alternatively, a necessary space between blocks may be determined for placing repeaters and if the space exceeds a predetermined relative threshold, part of the nets may be assigned to a higher constraint class. Advantageously, the next higher constraint class has a longer cycle reach, so wider or higher blocks can be routed over.

In an embodiment of the invention, additionally or alternatively, the routing for different constraint classes may be performed in parallel. This enhances the speed of the routing process significantly.

In an embodiment of the invention, additionally or alternatively, determining a specific delay time may be performed by one of a virtual timing model, an estimated timing model and an extraction timing model. It is helpful to take this into account when assigning the net constraints, because these timing models have different accuracies.

In an embodiment of the invention, additionally or alternatively, a distance of a repeater bay may be determined from an edge of the block and this distance may be compared with a specific delay time. Advantageously, it may be calculated how far the repeater bay is from the edge of the blocked area. This may then be compared to a cycle reach value.

In an embodiment of the invention, additionally or alternatively, nets with an additional net length for connecting a repeater outside the blockage and a negative slack may be assigned to a higher constraint class. Advantageously, the next higher constraint class has a longer cycle reach, so wider or higher blocks can be routed over.

In an embodiment of the invention, additionally or alternatively, further, if a block is larger than a repeater reach length, the net may be assigned to a higher constraint class until a sufficient repeater reach length and/or a positive slack is found. Advantageously, the next higher constraint class has a longer cycle reach, so wider or higher blocks can be routed over.

In an embodiment of the invention, additionally or alternatively, routing of nets may be performed for nets of an actual constraint bucket, and, if the bucket is not the first bucket, of all buckets existing in the list.

The router runs only on the nets of the current constraint bucket and, if it is no longer the first bucket, of all preceding buckets in the list. This gives a much more accurate routing result.

A data processing system is proposed for a multi-layer integrated circuit routing tool connecting sources with nets to sinks in a hierarchical multi-layer integrated circuit design environment. The system includes a memory, and a processing unit communicatively coupled to the memory. The data processing system performs a method including creating a cycle reach table containing a first set of information parameters for two dimensional nets per metal layer combination, creating a repeater reach table containing a second set of information parameters per constraint class, preparing a working list of nets by creating a list of nets with the same constraint class, starting with the first constraint class corresponding to a lowest metal layer combination, extracting and checking blocked areas in a wiring region, preparing a list of blocks larger than repeater reach dimensions by marking all blocks wider in length and width than a repeater reach length, creating blockages over these blocks on the metal layer given by the selected constraint class from the repeater reach table and creating a blockage on all higher metal layers up to the top most metal layer, connecting a source pin to a sink pin on preassigned metal layers by routing the net based on the given constraint class.

The proposed data processing system advantageously may be used for executing the method for a multi-layer integrated circuit routing tool as described above. Advantages of the proposed method may also be applied to the different embodiments of the data processing system and may not be repeated for reasons of convenience.

In an embodiment of the invention, additionally or alternatively, the system may include comparing a routed net length with a Steiner net length estimation for all nets being routed around the blockage, calculating a slack on routed nets, removing nets with positive slack from the working list, removing nets with negative slack and net length similar to the Steiner net length, removing the new wire solution for nets longer than the Steiner net length as a minimum length after moving them into the next constraint class, depending on being part of a category of nets with positive timing results, for nets with net length longer than the Steiner net length requesting an alternate routing solution based on a changed constraint class by either extending the wire width on the same metal layer based on the next constraint class from the repeater reach table or changing to the next constraint class by switching the wiring metal layer to an upper metal layer, in order to improve the slack for that net, repeating the above steps for each constraint class, in particular in N−1 routing sessions, where N is the number of given constraint classes, collecting the constraint results from each of the N routing sessions, running the routing sessions in a parallel approach.

In an embodiment of the invention, additionally or alternatively, further, nets of the working list may be prioritized such that nets with a higher complexity will be routed first and nets with a lower complexity will be routed afterwards, where the complexity, in particular, is defined by a number of sink pins in the entire path of the net or by using a wider wire width. And also the complexity is higher when the number of sinks is higher than 1.

In an embodiment of the invention, additionally or alternatively, the first set of information parameters for two-dimensional wiring per metal layer combination may include a metal layer combination, a metal layer width, a specific delay time. The second set of information parameters per constraint class may include a constraint class, a metal layer combination, a metal layer width and space, a repeater reach length.

In an embodiment of the invention, additionally or alternatively, a necessary space between blocks may be determined for placing repeaters and if the space exceeds a predetermined relative threshold part of the nets may be assigned to a higher constraint class.

In an embodiment of the invention, additionally or alternatively, the routing for different constraint classes may be performed in parallel. For runtime reasons, the constraint classes are not processed sequentially, but are executed simultaneously using a parallel approach. This parallel approach is also used for the evaluation.

In an embodiment of the invention, additionally or alternatively, determining a repeater reach timing may be performed by one of a virtual timing model, an estimated timing model, an extraction timing model.

In an embodiment of the invention, additionally or alternatively, a distance of a repeater bay may be determined from an edge of the block and this distance may be compared with a repeater reach timing.

In an embodiment of the invention, additionally or alternatively, nets with an additional net length for connecting a repeater outside the blockage and a negative slack may be assigned to a higher constraint class.

In an embodiment of the invention, additionally or alternatively, further, if a block is larger than a repeater reach length, the net may be assigned to a higher constraint class until a sufficient repeater reach length and/or a positive slack is found.

In an embodiment of the invention, additionally or alternatively, routing of nets may be performed for nets of an actual constraint bucket, and, if the bucket is not the first bucket, of all buckets existing in the list.

Further, a computer program product is proposed for a multi-layer integrated circuit routing tool connecting sources with nets to sinks in a hierarchical multi-layer integrated circuit design environment.

The computer program product includes a computer readable storage medium having program instructions embodied therewith, the program instructions executable by the computer system to cause the computer system to perform a method including creating a cycle reach table containing a first set of information parameters for two dimensional nets per metal layer combination, creating a repeater reach table containing a second set of information parameters per constraint class, preparing a working list of nets by creating a list of nets with the same constraint class, starting with the first constraint class corresponding to a lowest metal layer combination, extracting and checking blocked areas in a wiring region, preparing a list of blocks larger than repeater reach dimensions by marking all blocks wider in length and width than a repeater reach length, creating blockages over these blocks on the metal layer given by the selected constraint class from the repeater reach table and creating a blockage on all higher metal layers up to the top most metal layer, connecting a source pin to a sink pin on preassigned metal layers by routing the net based on the given constraint class.

The proposed computer program product advantageously may be used for implementing the method for a multi-layer integrated circuit routing tool as described above. Advantages of the proposed method may also be applied to the embodiment of the computer program product and may not be repeated for reasons of convenience.

A data processing system for execution of a data processing program is proposed, including computer readable program instructions for performing the method described above.

BRIEF DESCRIPTION OF THE DRAWINGS

The present invention together with the above-mentioned and other objects and advantages may best be understood from the following detailed description of the embodiments, but not restricted to the embodiments.

FIG. 3 depicts a cycle reach table, according to an embodiment.

DETAILED DESCRIPTION

Figure 1:
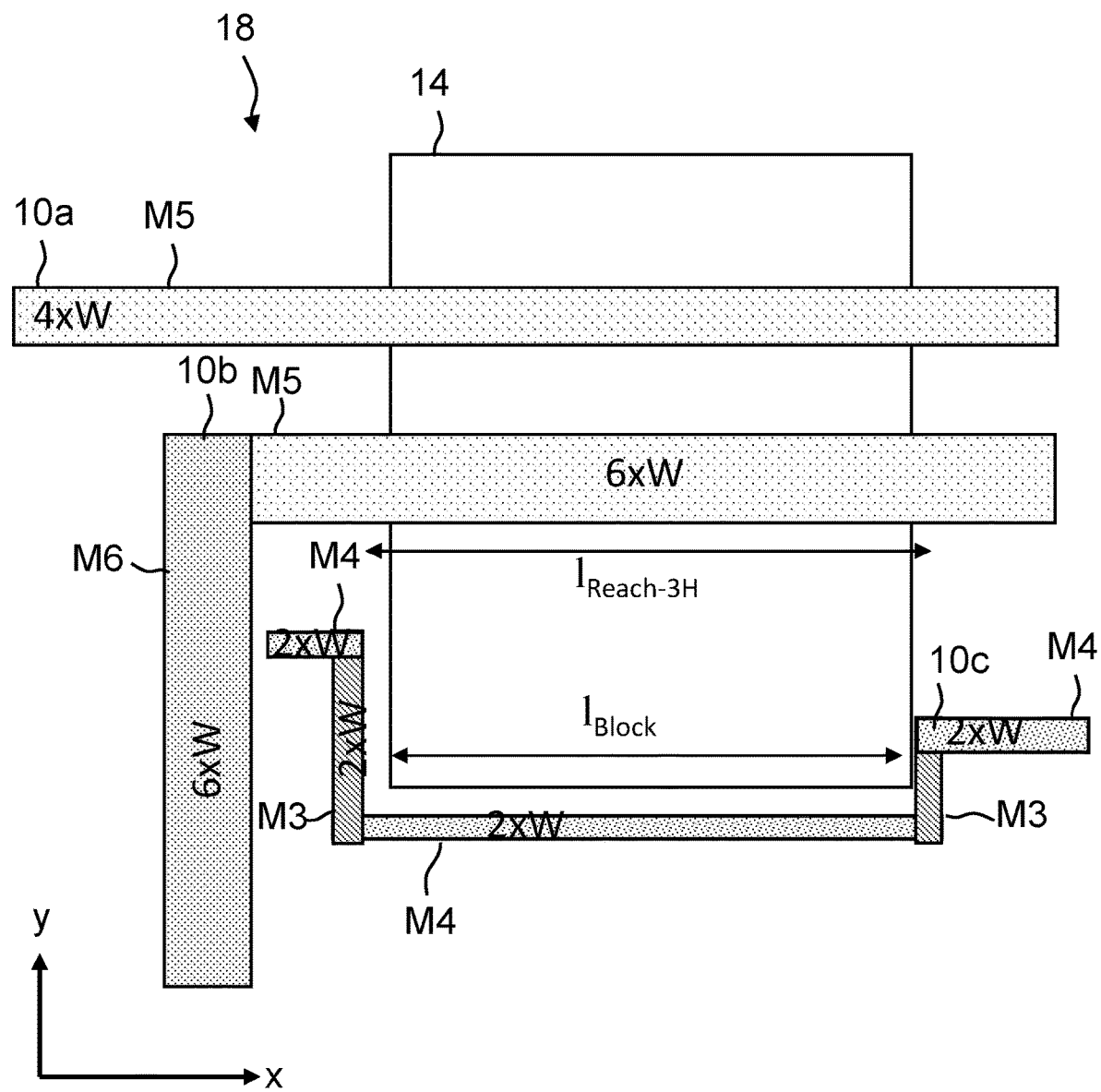
FIG. 1 depicts a layout of nets of different widths across a block according to state of the art, according to an embodiment.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for a multi-layer integrated circuit routing tool connecting sources with nets to sinks in a hierarchical multi-layer integrated circuit design environment. The method includes creating a cycle reach table containing a first set of information parameters for two dimensional nets per metal layer combination, creating a repeater reach table containing a second set of information parameters per constraint class, preparing a working list of nets by creating a list of nets with the same constraint class, starting with the first constraint class corresponding to a lowest metal layer combination, extracting and checking blocked areas in a wiring region, preparing a list of blocks larger than repeater reach dimensions by marking all blocks wider in length and width than a repeater reach length, creating blockages on the metal layer given by the selected constraint class from the repeater reach table and creating a blockage on all higher metal layers up to the top most metal layer, connecting a source pin to a sink pin on preassigned metal layers by routing the net based on the given constraint class.

The illustrative embodiments may further be used for a data processing system for a multi-layer integrated circuit routing tool connecting sources with nets to sinks in a hierarchical multi-layer integrated circuit design environment. The system includes a memory, and a processing unit communicatively coupled to the memory. The data processing system performs a method includes creating a cycle reach table containing a first set of information parameters for two dimensional nets per metal layer combination, creating a repeater reach table containing a second set of information parameters per constraint class, preparing a working list of nets by creating a list of nets with the same constraint class, starting with the first constraint class corresponding to a lowest metal layer combination, extracting and checking blocked areas in a wiring region, preparing a list of blocks larger than repeater reach dimensions by marking all blocks wider in length and width than a repeater reach length, creating blockages on the metal layer given by the selected constraint class from the repeater reach table and creating blockages on all higher metal layers up to the top most metal layer, connecting a source pin to a sink pin on preassigned metal layers by routing the net based on the given constraint class.

Semiconductor chips include a transistor layer, the actual semiconductor and various metal layers which the transistors are connected to and interconnected. The connections are made by different metal layers. The semiconductor near layers, also lower metal layers, are thin, due to small transistor connections, bridge short distances and have a small cross section, which leads to a high resistance and to a high RC-delay, $\Delta t_{RC}=1/R \cdot C$. The metal layers above are wider and thicker, have a larger cross section and comparably lower resistance, have comparably larger spacing between the wires, resulting in a lower capacitance and thus exhibit lower RC-delays. Accordingly, the metal layers above are used to bridge longer distances. According to the width of the metal layers, the distances between the wires are related to each other. The layers are connected to each other by vias. The vias are holes in the insulating layers between the individual metal layers, which are filled with metal. The vias often include copper or aluminium.

The metal lines and metal layers are insulated from each other, for example with silicon dioxide. During production, an insulating layer is applied, into which recesses for the metal lines or vias are then etched and subsequently filled with metal.

FIG. 1 depicts a wiring region 18, in an embodiment. The wiring region 18 includes a layout of nets, each net with differing routings marked 10a, 10b and 10c. Each net 10b, 10c consists of wires which are implemented on metal layers and vias connecting the metal layers. The layout of nets 10a, 10b, 10c are of different widths and are across a block 14.

The naming of the metal layers with M1 to Mn refers to a vertical position of these metal layers, where n is an index number of the metal layer. M1 is the lowest, followed by M2, and so on. They can have different width in x or y direction, as indicated in FIG. 1, or height in a vertical z direction; their cross section can be bigger in Mn+1 than in Mn. Guiding a M5 layer over block 14 means that it is routed within the borders of block 14. For nets 10a and 10b this means they are routed over block 14.

Widths are marked with 2×W, 4×W, 6×W and are multiples of a single width 1×W. $l_{Block}$ marks a width of the block 14. $l_{Reach-3H}$ is a width necessary for placing repeaters outside of the block 14 area. This repeater reach length is defined in the repeater reach table 30 depicted in FIG. 4. As the metal layers in block 14 are blocked for routing from M1 to M4 including net has to be guided around block 14.

Figure 2:
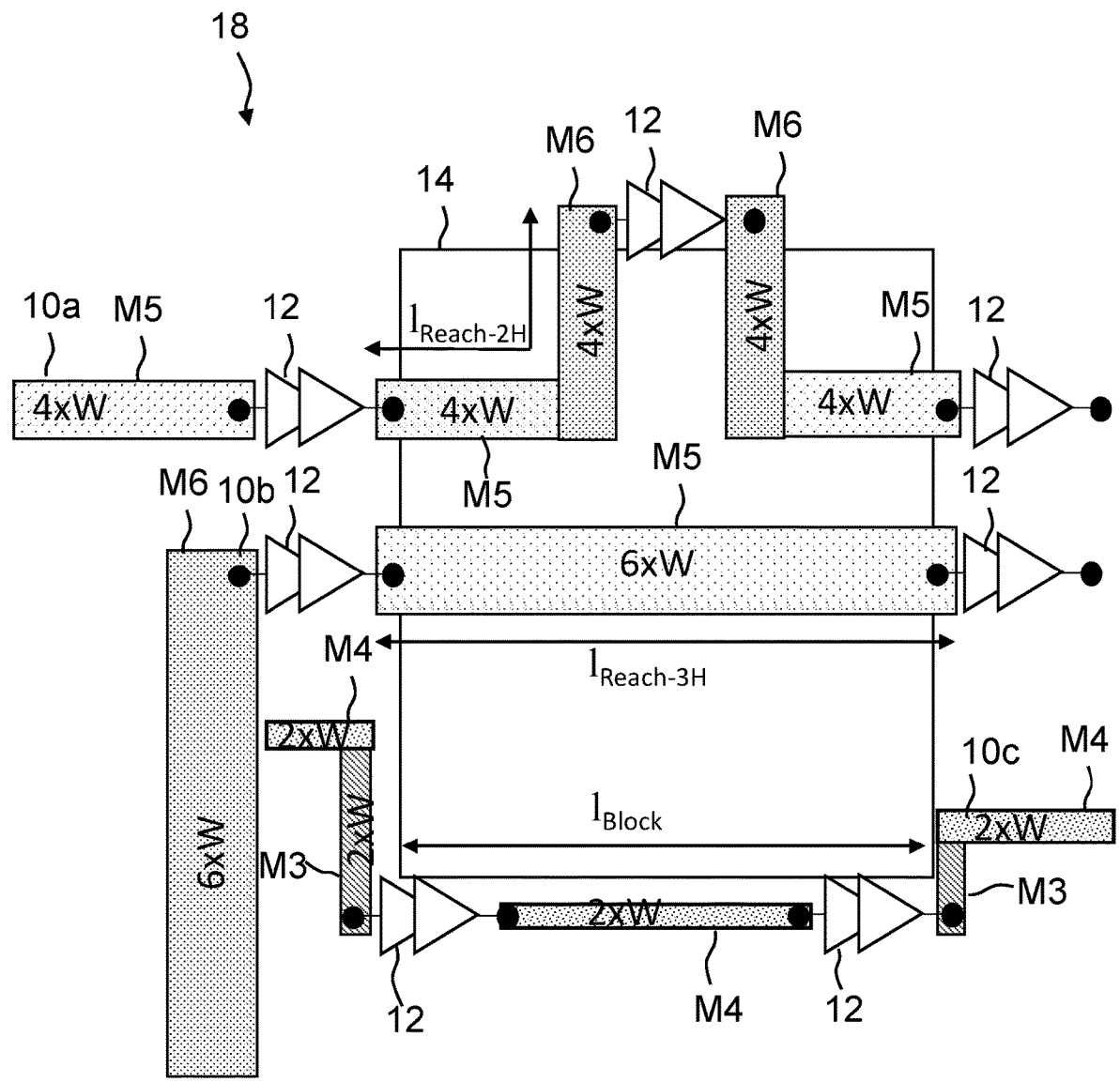
FIG. 2 depicts a layout of nets of different widths with repeaters across a block according to state of the art, according to an embodiment.

As it is allowed to have the same metal layer M1 or M5 in different widths, in FIGS. 1 and 2 there are two metal layers M5 shown with different widths 4×W and 6×W.

A router wires the nets 10a, 10b, 10c on the available metal layers M3, M4, M5, M6. The nets 10a, 10b, 10c are routed over the block 14 without placing repeaters, as shown for the net 10a and the net 10b. Thin wires are also routed over block 14 for which the block 14 is too wide. As shown in FIG. 1, the net 10a results with metal layer M5 and a width of 4×W. A distance of the repeater reach of this layer with a width of 4×W is smaller than the width $l_{Block}$ of the block 14, whereas a distance of the repeater reach of the layer M5 with a width of 6×W, net 10b, is sufficient. Based on the timing requirements and the requirement of keeping the space for wiring free from congestions set for the routing of the nets in this example of prior art, this solution is sufficient because the timing is still assumed to be ideal.

The physical properties defined in this way, as e.g. the RC delay, result in requirements for the installation of repeaters 12 or inverters (as shown in FIG. 2) and their distance from each other to overcome problems caused by the RC delay. Unfortunately, a greedy buffer, as a repeater based on virtual timing according to state of the art, is assumed to be placeable everywhere, e.g. inside blocked areas. This does not correspond to reality, specifically, a greedy buffer is not actually placeable everywhere.

The problem is aggravated by the fact that the hierarchical blocks 14 increase in complexity and thus in size, resulting in difficulty laying out the wiring and meeting all requirements.

FIG. 2 depicts the wiring region 18, in an embodiment. FIG. 2 depicts a layout of nets 10a, 10b, 10c, of different widths 2×W, 4×W, 6×W, with repeaters 12 across a block 14 according to state of the art. The nets 10a, 10b, 10c are realized on different metal layers M3, M4, M5, M6.

FIG. 2 shows a net 10a (4×W) where a repeater 12 has been installed in front of, behind the block 14 and also above. This net 10a has a length that is longer than necessary, this length is called a Manhattan distance and timing problems can occur due to the additional repeater delay and the additional wire.

The block 14 is blocked up to the metal layer M4. It is impossible to place inside this block 14 the repeaters 12 which are important for the nets 10a, 10b, 10c. For nets 10a and with the width 4×W and 6×W on metal layers M5 and M6 and the repeaters 12 are placed outside the block 14 and thus create additional net length, a so-called scenic net. If metal layers are chosen for nets 10 that are lower or equal to the top blocked layer of the block 14, these nets must be routed around the block, as is shown in FIGS. 1 and 2 with the net 10c on metal layers M3 and M4 with a width of 2×W. If thin nets 10 are routed over a block 14 that require a repeater 12 in the area of the block 14, then this repeater 12 must be placed outside the block 14, thus extending the net 10.

It would be simpler to take the blocks 14 over which nets 10 will be routed into account when assigning the metal layers to the nets 10.

The Steiner net length is the shortest net length possible resulting from the start and end point of the net 10:

$$l_{Steiner} = |x_{endpoint} - x_{start\ point}| + |Y_{end\ point} - Y_{start\ point}|$$

where x and y are rectangular coordinates of the points. The actual net length is obtained from the wiring. The deviation of the scenic nets 10 is the difference between the actual and the Steiner net length $$\Delta l_{net} = l_{wiring} - l_{Steiner}$$

FIG. 3 depicts a cycle reach table 20.

A metal layer combination 22 column shows examples of different metal layers M1, M2, M3, M4, M5, M6, M7 and M8. Pairs of metal layers, such as M1/M2, are used for two-dimensional wiring in orthogonal directions. The metal layers M1, M2, M3, M4, M5, M6, M7, M8 correspond to references M1, M2, M3, M4, M5, M6, M7, M8 in the FIGS. 1, 2 and 5, 6.

The metal layer combination 22 may be implemented in different widths 24, e.g., 1×, i.e., with factor 1, up to 12×, i.e., with a factor 12 if compared to the '1×M1/M2' line of the cycle reach table 20. The naming of the metal layer in the cycle reach table 1×M1/M2 means one times the metal layers M1 or M2 which preferably have the same width, where the width could vary, but M2 being in z direction stacked above M1 and run along a different x or y direction (might be orthogonal to each other). The metal layers M1 and M2 also have the same height, therefore they have the same cross section. Corresponding, specific delay times 28, Δt, are also shown as a fraction factor of the first metal layers M1 or M2.

The cycle reach table 20 defines a reach 26 for a metal layer combination 22, which is the maximum distance a net 10 on a metal layer combination 22 with a defined width 24 may be routed before renewing a signal by a repeater. The reach 26 depends on the RC delay of the metal layer combination 22.

The cycle reach table 20 takes into account the RC delay of the different metal layer combinations 22. FIG. 1 shows how the different RC delay comes about: the lower metal layers (M1, M2) are thinner (1×H) and narrower (1×W) than the higher metal layers. This results in a smaller cross-section and thus higher resistance.

However, different widths 24 are allowed on one metal layer combination 22 (M1: 1×W, 1.5×W, 2×W, 3×W). These properties lead to different specific delay times $\Delta t_{delay}$ 28 when comparing the different metal layers combinations 22. These are listed in the cycle reach table 20. The specific delay time 28 indicates the retardation time per length in ps per μm in relation to the metal layer combination 22.

Figure 4:
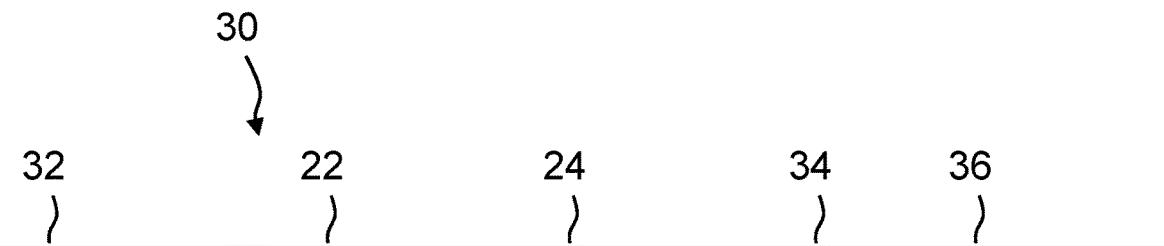
FIG. 4 depicts a repeater reach table, according to an embodiment.

FIG. 4 depicts a repeater reach table 30.

Constraint classes 32 combine certain metal layers combinations 22, width 24 and space 34 where space 34 is a distance to a neighbouring net 10. The different combinations of metal layer combinations 22, width 24 and space 34 result in different constraint classes 32. The method assigns one of the defined constraint classes 32 as a property to each net 10. This is later evaluated by the router, which then wires the nets 10 on the corresponding metal layer combinations 22 with the defined width 24 and space 34 to other nets 10.

The delay time 28 Δt can now be used to calculate repeater spacing which must be maintained on which metal layer combinations 22 in order not to fall below a certain defined signal edge steepness. This maximum repeater spacing then defines which size of a block 14 can be routed over with which metal layer combinations 22 and width 24. The repeater spacing is important so that the signal edge at the receiver input does not fall below a defined value.

This repeater reach length 36 is listed in the repeater reach table 30 for each combination of constraint class 32, metal layer combinations 22, width 24 and space 34. The repeater reach length 36 differs from the reach 26 as listed in FIG. 3 in the cycle reach table 20. The repeater reach length 36 takes into account a smearing of the signal edges due to the width 24 of nets 10 and space 34 which is a distance between neighbouring nets 10. The repeater reach length 36 thus is a distance of repeaters 12 required for maintaining a defined steepness of signal edges.

The blocks 14 instantiated in semiconductor design often have dimensions that correspond to a multiple of the repeater reach 26, which means that a jump to the next constraint class 32 is not sufficient to route the corresponding block 14 over.

In addition, constraint classes 32 often overlap in practice: Double-width wires on a metal layer Mn have a similar repeater reach 26 as single-width wires of a metal layer Mn+1, with n being an index number of a metal layer. These properties are then reflected in the repeater reach table 30. The method takes these properties into account because the total width/height is compared against the repeater reach 26. If the width/height of an instance is a multiple of the repeater reach 26, then the method searches until a repeater reach 26 is found that can route over it or a scenic net no longer leads to a negative slack.

Advantageously, before a router wires nets 10 into an integrated circuit, wire constraints are assigned to these nets 10. A wire constraint specifies the metal layers combination 22 to be used, the wire width 24 and the wire spacing 34. The available timing model of a chip and its sub-blocks makes it possible to determine the RC delay available for the wiring of each net 10 and to derive the corresponding metal layer combinations 22 and widths 24 from it. The nets 10 are assigned a property, the constraint class 32, in which the metal layer combinations 22, the widths 24 to be used and the distances to be maintained are coded. This method extends the calculation of the constraint classes 32 to be used by taking into account the dimensions of all instantiated blocks 14 that lie under a mesh, in addition to the given timing model. From the dimensions of the blocks 14 it calculates if the previously selected metal layer combination 22 is higher than the highest blocked layer of the blocks 14 and if with this metal layer combination 22 and the wire width 24 all blocks 14 can be routed over without having to place repeaters 12 inside the block 14, which is not allowed. This would lead, if the block size is not taken into account to the fact that the wires of the nets 10 have to be routed differently after inserting the repeaters 12 than before.

Determining a repeater reach timing may be performed by one of a virtual timing model, an estimated timing model, and an extraction timing model.

Figure 5:
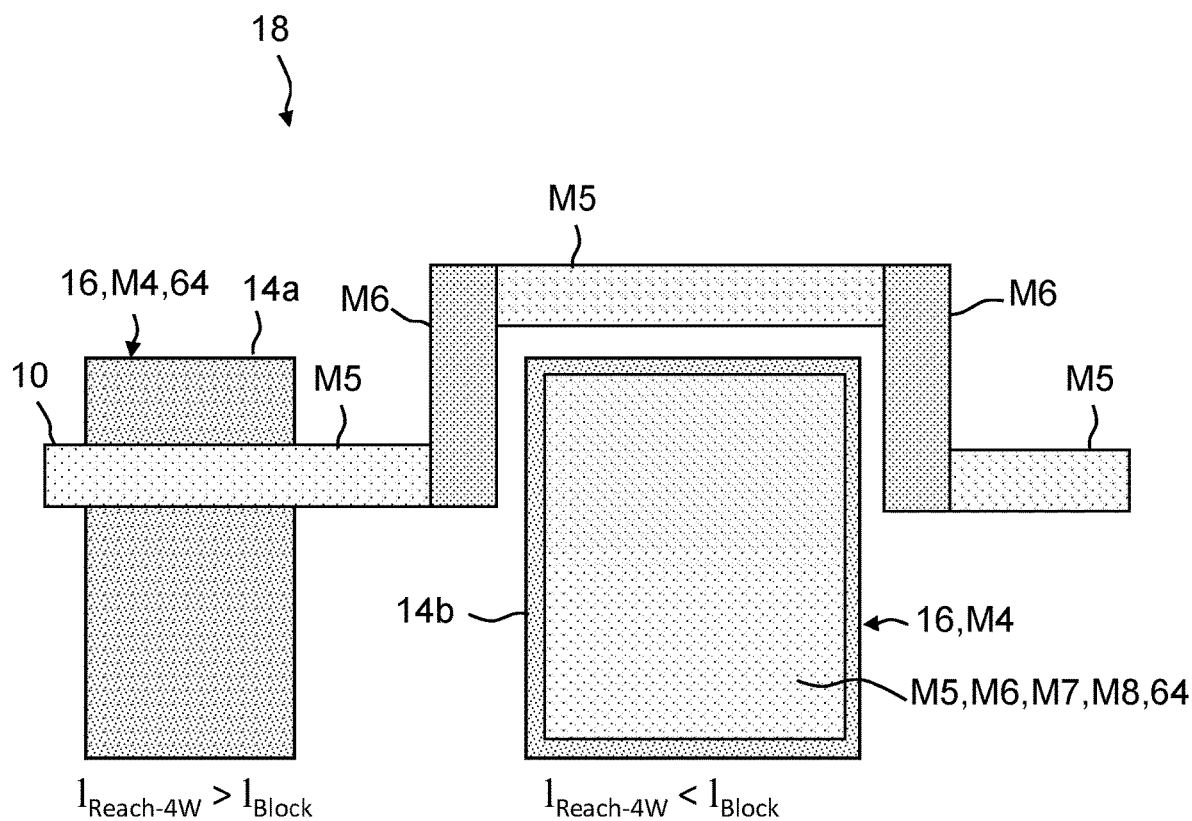
FIG. 5 depicts a layout of nets with a blockage on a block according to an embodiment of the invention, according to an embodiment.

FIG. 5 depicts a wiring region 18 for choosing a layout of nets 10 with a blockage 64 on a block 14 according to an embodiment of the invention. In block 14a routing is blocked for the metal layers M1, M2, M3 and M4. In block 14b additionally all the metal layers above M4 are also blocked.

The proposed method takes advantage of the fact that the router does not wire through routing blockages 64, but goes around the blockages 64. As a result, the wired nets 10 are longer than a minimum Steiner length, where the Steiner length describes the shortest possible connection between two points.

Before wiring, all blocks 14 instantiated in the floor plan are examined to see if their height or width 24 is greater than the repeater reach 36 of a constraint class 32.

On blocks 14 for which this is true like block 14b, additional blockages are placed on top so that all metal layer combinations 22 are blocked. Then, all nets 10 of this constraint class 32 are wired as Steiner nets. The router is configured to use only the metal layer combinations 22 defined in the constraint class 32. The blocked blocks 14 force the router to wire the nets 10 around the outside of the blocks 14, so their lengths no longer match the Steiner minimum length. Blocks 14 that are not blocked are spanned by the router with wires.

Next the method filters out the wired nets 10 that are longer than the Steiner length or that have a negative slack. The slack of a net 10 is a time difference calculated from the required-arrival-time and the actual-arrival-time:

$$t_{slack} = t_{required-arrival-time} - t_{actual-arrival-time}$$

In an unwired net 10, the timing model uses the Steiner wire length and estimates the RC delay:

$$t_{slack-estimated} = t_{required-arrival-time-estimated} - t_{actual-arrival-time-estimated}$$

of the wire using the cycle reach table 20. The slack for the net 10 is then calculated:

$$t_{slackEstimate} = t_{required-arrival-time} - t_{actual-arrival-time} - \Delta t_{RCdelayEstimated}$$

In the wired net 10 the slack is calculated using the RC delay $\Delta t_{RCdelay}$ of the actual wire used:

$$t_{slackExtract} = t_{required-arrival-time} - t_{actual-arrival-time} - \Delta t_{RCdelay}$$

These filtered out nets 10 are then assigned to the next higher constraint class 32. The method then deletes all previously routed wires and blockages 64 for those selected nets 10 and starts the analysis with the next constraint class 32.

In FIG. 5 two blocks 14a and 14b are shown. For routing of nets 10, there exist blockages 64 on the metal layer M4. The blocks 14 having a blockage 64 can be named a blocked region 16. Therefore the net 10 is routed on metal layers M5, M6 around the block 14b for which the reach 26, $l_{Reach-4W}$, is smaller than the width $l_{Block}$ of the block 14. The other block 14a, for which the reach 26, $l_{Reach-4W}$, is larger than the width $l_{Block}$ of the block 14, is routed over by the net 10. On top of the block 14a a deviated blockage 64 is created by a metal area on a level of metal layer M5 and M6.

A necessary space between blocked areas 16 may be determined for placing repeaters 12 and if the space exceeds a predetermined relative threshold part of the nets 10 may be assigned to a higher constraint class 32. A repeater bay is a part of a blocked area 16 where repeaters could be placed from outside. A distance of a repeater bay from an edge of the blocked region 16 may be determined and this distance is then compared with a repeater reach timing.

Advantageously, nets 10 with an additional net length for connecting a repeater 12 outside the blockage 64 and a negative timing delay may be assigned to a higher constraint class 32.

Favorably, if a block 14 is larger than a repeater reach length 36, the net 10 may be assigned to a higher constraint class 32 until a sufficient repeater reach length 36 and/or a positive timing delay is found.

The next higher constraint class 32 has a longer cycle reach 26, so wider or higher blocks 14 can be routed over. Again, it is analysed which block 14 is wider and/or higher than the longer cycle reach 26 of the higher constraint class 32. The router can wire the Steiner length net because there are no blockages 64, the method will no longer filter it out because it is too long, and thus this net 10 will retain in the new constraint class 32. This ensures that later, when inserting the repeaters 12, their maximum distances will not be exceeded by the blocks 14.

Figure 6:
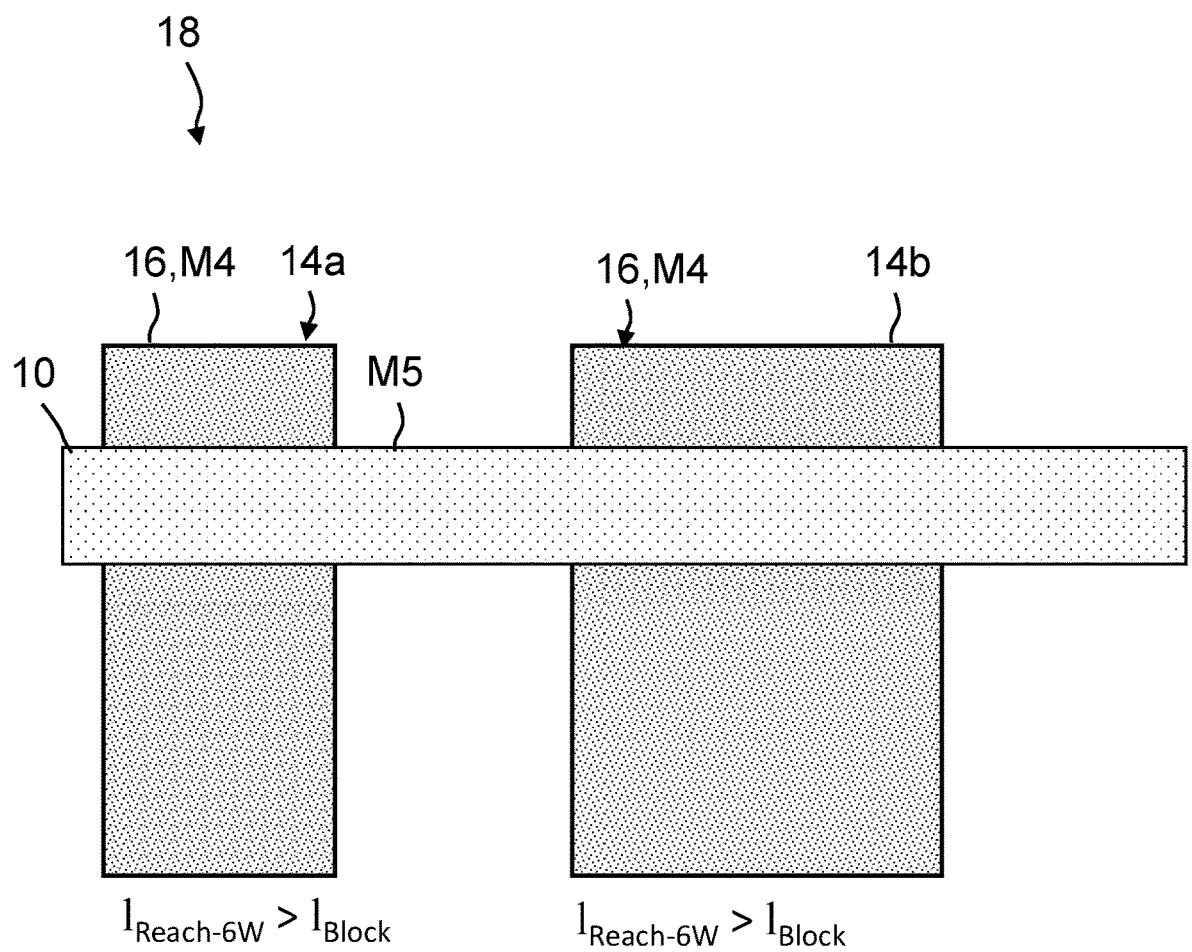
FIG. 6 depicts a layout of nets on a higher constraint class where the block is not blocked, according to an embodiment.

FIG. 6 depicts a layout of nets 10 on a higher constraint class 32 than is shown in FIG. 5 where the blocks 14 are not blocked, according to an embodiment.

The two blocks 14a and 14b are blocked up to a metal layer M4, but on the next two higher metal layers M5 and M6 there is no blockage, so that the net 10 may be routed across the two blocks 14a and 14b on a level of the metal layer M5.

Advantageously, the routing for different constraint classes 32 may be performed in parallel. For runtime reasons, the constraint classes 32 are not processed sequentially, but are executed simultaneously using a parallel approach. This parallel approach is also used for the evaluation.

The routers used in the industry check the wireability of a unit by means of congestion analysis. The unit area is divided into small areas, g-cells. These are only partially filled with wires in the case of lower and middle metal layers, and completely filled with wires in the case of the uppermost metal layers.

Concerning a placement congestion, it is advantageously investigated whether the spaces between the blocks 14 are sufficient to accommodate all repeaters 12. The size of the space between the blocks 14 is calculated. This is compared with the required area of all repeaters 12 needed for the nets 10 that are routed across this gap. Since the reach is known, possible locations of the repeaters 12 can be calculated. The area of the required repeater 12 is then summed up for each net 10 routed over the interstitial space. Suitable threshold values are used to determine how far the interstitial space can be filled. If the required repeater area is larger than the maximum filling, some of the nets 10 must be assigned to a higher constraint class 32 in order to reduce the repeater area.

In hierarchical design, blocks 14 called core, unit, memory, RAMs, registers, adders, RLMs, etc. are used. These blocks 14 are blocked up to a certain metal layer, e.g. M4. Units/cores using such blocks 14 must define their wires/nets 10 in such a way that over these blocks 14, which internally do not allow placement of repeaters 12, can be routed over by the wires/nets 10. It should be noted that a block 14 of a certain size blocked up to and including M4 will not be routed over by a net/wire 10 having a metal layer combination 22 with width 1× or 1.5×M5/M6, for example, but it will be routed over by a wire/net having a metal layer combination 22 with the width of 2×M5/M6. The method will therefore try to find a width on the M5/M6 metal layer that will allow said block to be routed over before resorting to the M7/M8 metal layer combinations 22. The same design can also contain blocks 14 which, for example, only block up to and including M3 and thus make more resources available to the unit.

Figure 7:
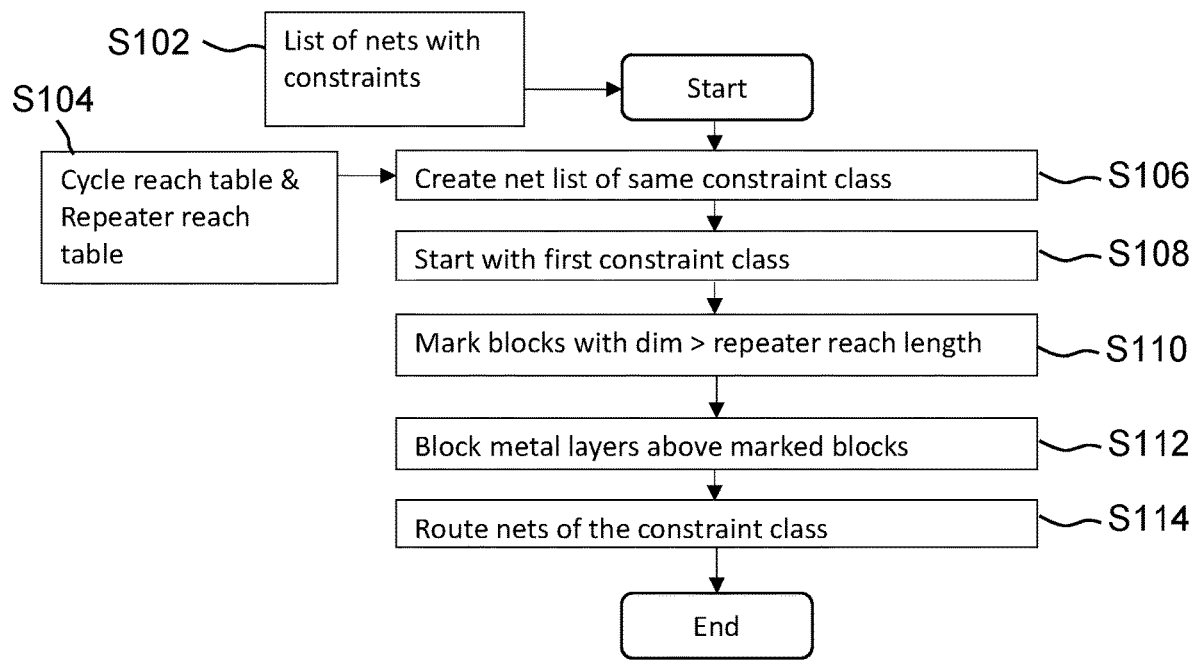
FIG. 7 depicts a flowchart of the method for a multi-layer integrated circuit routing tool connecting sources of nets to sinks in a hierarchical multi-layer integrated circuit design environment according to an embodiment of the invention for a single constraint class, according to an embodiment.

FIG. 7 depicts a flowchart of a method for a multi-layer integrated circuit routing tool connecting sources with nets 10 to sinks in a hierarchical multi-layer integrated circuit design environment according to an embodiment of the invention for a single constraint class 32.

The algorithm uses a sorted list of constraint classes 32 occurring in the design. Each net 10 can have default constraints or also predefined constraints, which were generated e.g. according to timing aspects. This list of nets 10 with constraints serves as an input in step S102 before starting the process.

A cycle reach table 20 is created containing a first set of information parameters for two dimensional nets 10 per metal layer combination 22, as shown in FIG. 3. This first set of information parameters comprises at least: a metal layer combination 22, a metal layer width 24, a repeater reach timing per length 26.

Next a repeater reach table 30 is created based on information of the cycle reach table 20, containing a second set of information parameters per constraint class 32, as shown in FIG. 4. The second set of information parameters comprises at least: a constraint class 32, a metal layer combination 22, a metal layer width 24 and a repeater space 34, a repeater reach length 36. This constraint classes 32 in the repeater reach table 30 serve as an input to the flowchart of FIG. 7 in step S104.

A working list of nets is prepared by creating a list of nets 10 with the same constraint class 32 in step S106.

In step S108 the process starts routing with the first constraint class 32 corresponding to a lowest metal layer combination 22.

Blocked areas 16 in a wiring region 18 are extracted and checked.

Followed by preparing a list of blocks 14 larger than repeater reach dimensions by marking all blocks 14 wider in length and width than a repeater reach length 36 in step S110.

Blockages 64 are created in step S112 on the metal layer M1, M2, M3, M4, M5, M6, M7, M8 given by the selected constraint class 32 from the repeater reach table 30 and a blockage 64 created on all higher metal layers M1, M2, M3, M4, M5, M6, M7, M8 up to the top most metal layer M8.

Then in step S114 the process continues by connecting a source pin to a sink pin on preassigned metal layers defined by the constraint class by routing the nets 10 based on the given constraint class 32.

Figure 8:
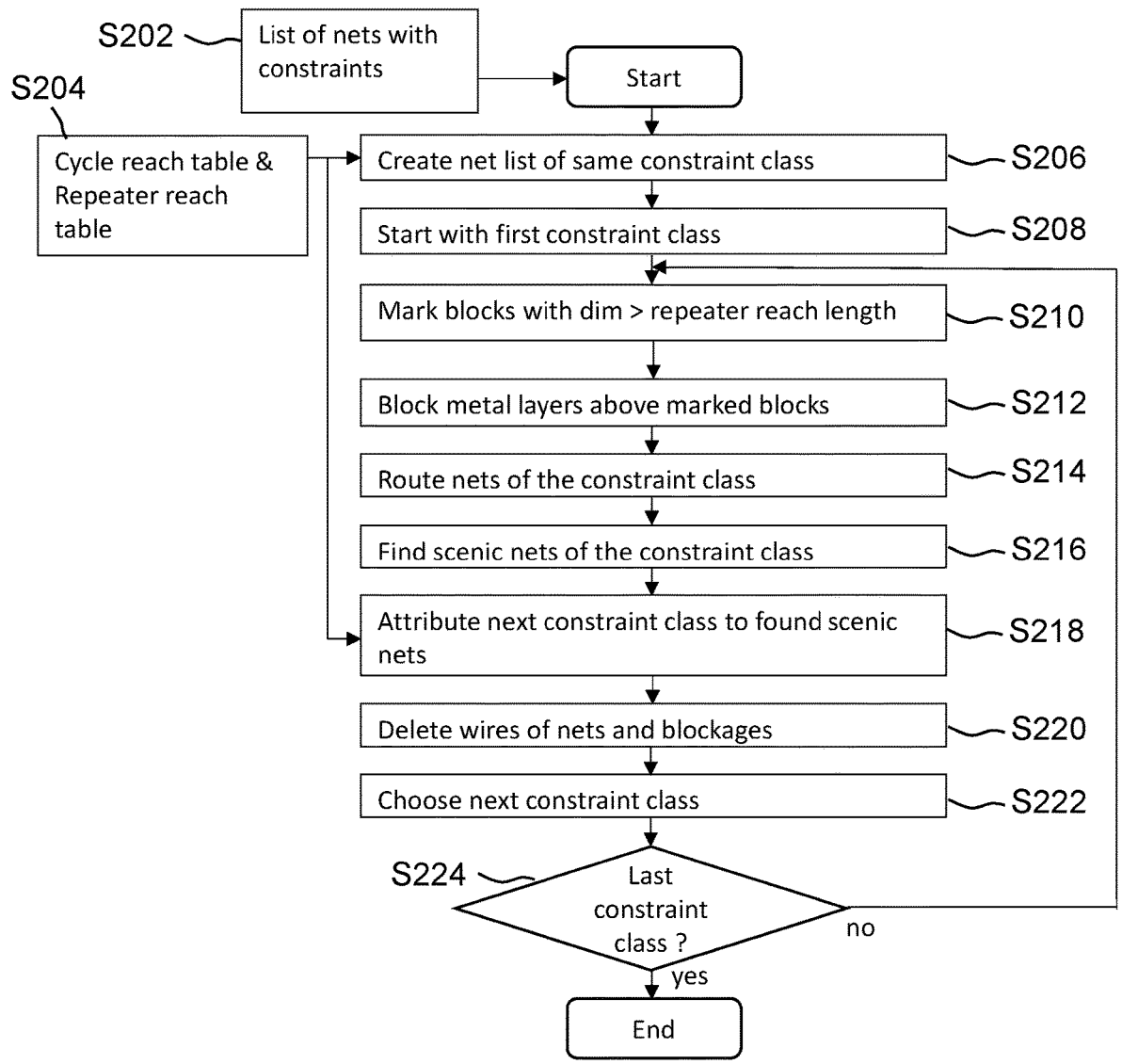
FIG. 8 depicts a flowchart of the method with eliminating nets with additional net length according to a further embodiment of the invention, according to an embodiment.

FIG. 8 depicts a flowchart of the method, according to a further embodiment of the invention.

Steps S202 to S214 are processed according to the flowchart for a single constraint class 32, following steps S102 to S114 as described for FIG. 7.

The process continues with step S216 where comparison is made of a routed net length with a Steiner net length estimation for all nets 10 being routed around the blockage 64, which means all scenic nets 10 of the current constraint class are searched.

Next in step S218 the next constraint class 32 from the repeater reach table 30 is attributed to the found scenic nets 10.

Then all wires of the found scenic nets 10 and all blockages 64 are deleted in step S120, followed by choosing the next constraint class 32 in step S222.

In step S224 it is checked if this was the last constraint class 32. If this is the case the process is ended. If not, the process continues the loop with step S210 by marking the blocks 14.

According to a further embodiment a routed net length may be compared with a Steiner net length estimation for all nets 10 being routed around the blockage 64. Then a slack on routed nets 10 may be calculated.

Nets 10 with positive slack may be removed from the working list. Nets 10 with negative slack and net length similar to the Steiner net length may also be removed.

Then the new wire solution for nets 10 longer than the Steiner net length as a minimum length may be removed after moving them into the next constraint class 32, depending on being part of a category of nets 10 with positive timing results.

For nets with a net length longer than the Steiner net length an alternate routing solution may be requested based on changed wiring constraints by either extending the wire width on the same metal layer M1, M2, M3, M4, M5, M6, M7, M8 based on the next constraint class 32 from the repeater reach table 30 or changing to the next wire constraint class 32 by switching the wiring metal layer M1, M2, M3, M4, M5, M6, M7, M8 to an upper metal layer M1, M2, M3, M4, M5, M6, M7, M8, in order to improve the timing delay for that net 10.

The steps from S210 to S222 may be repeated for each wire constraint class 32, in particular in N−1 parallel routing sessions, where N is the number of given wire-constraint classes 32.

Continuously the wire-constraint results from each of the N parallel routing sessions may be collected.

Nets 10 of the working list may be prioritized such that nets 10 with a higher complexity will be routed first and nets with a lower complexity will be routed afterwards. In particular the complexity may be defined by a number of sinks in the entire path of the net 10 or by a number of direction changes of the net 10 or by using a wider wire width or space 34.

Figure 9:
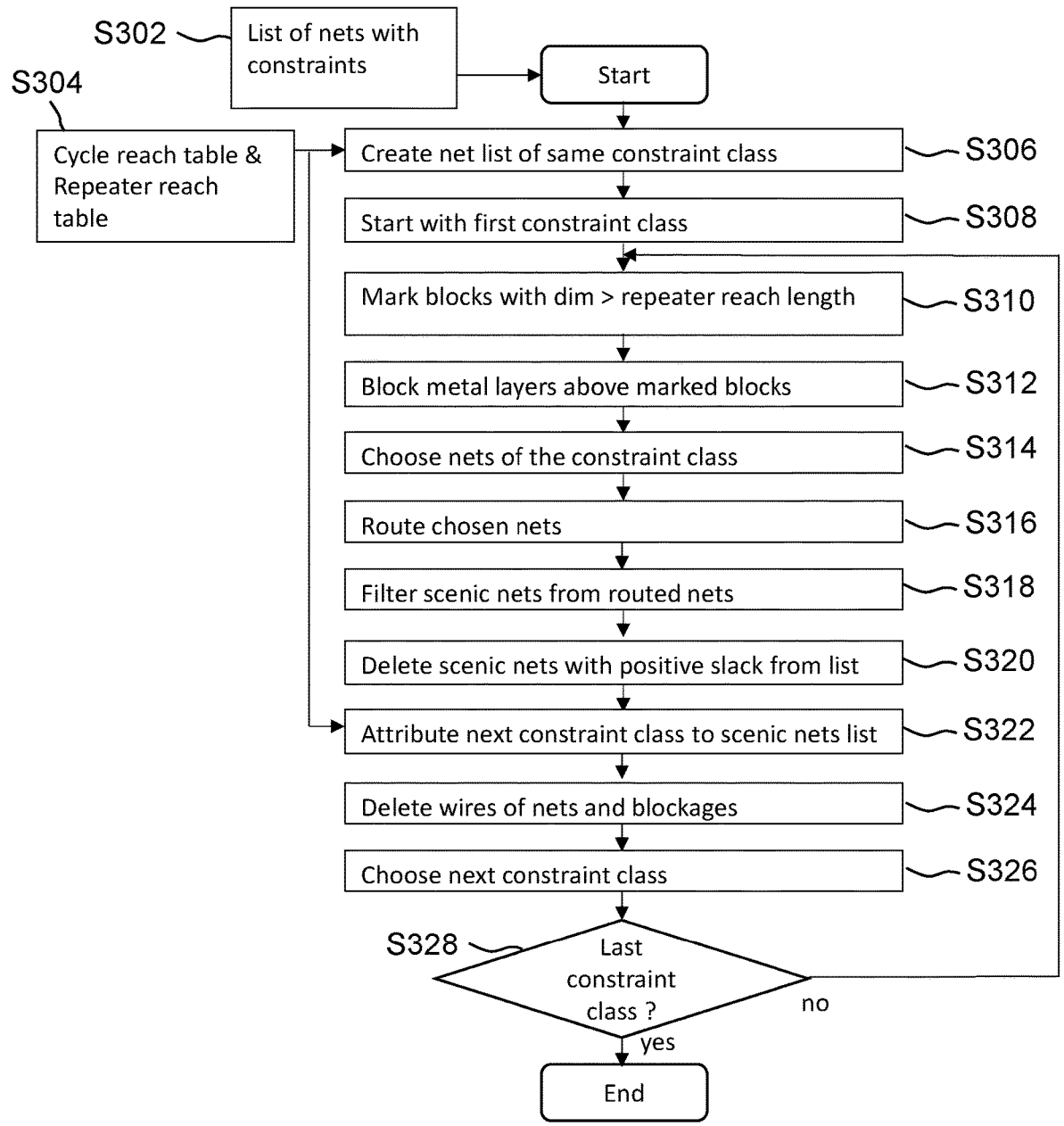
FIG. 9 depicts a flowchart of the method with eliminating nets with additional net length according to a further embodiment of the invention, according to an embodiment.

FIG. 9 depicts a flowchart of the method with eliminating nets 10 with additional net length, nets 10, according to a further embodiment of the invention.

The flowchart in FIG. 9 deals with sorting out nets 10 with positive slack which may have an uncritical timing.

Nets 10 are unproblematic if they have a positive slack. In this method it is then guaranteed that the scenic net 10 was calculated correctly by the "wiring detour" in its excess length. If then the slack is positive, this net 10 can be realized in this way. Because there is enough reserve in the timing, these nets 10 are not assigned to the next higher constraint class 32.

Direct current (DC) nets, nets with scan signals may e.g. belong to these nets 10.

In the flowchart of FIG. 9 the first steps from S302 to S312 are equivalent to the steps S202 to S212 in FIG. 8. Then in step S314 all nets 10 of the current constraint class 32 are chosen and routed in step S316.

Next in step S318 the scenic nets 10 are filtered out from the routed nets 10. In step S320 the scenic nets 10 with a positive slack are deleted from the list of scenic nets 10.

Then in step S322 the next constraint class 32 is attributed to the nets 10 of the scenic nets list which are the scenic nets with negative slack.

As in the previous flow chart shown in FIG. 8 in step S324 then all wires of all found nets 10 and all blockages 64 are deleted and the next constraint class 32 chosen in step S326.

In step S328 it is checked if this was the last constraint class 32. If this is the case the process is ended. If not the process continues the loop with step S310 by marking the blocks 14.

Figure 10:
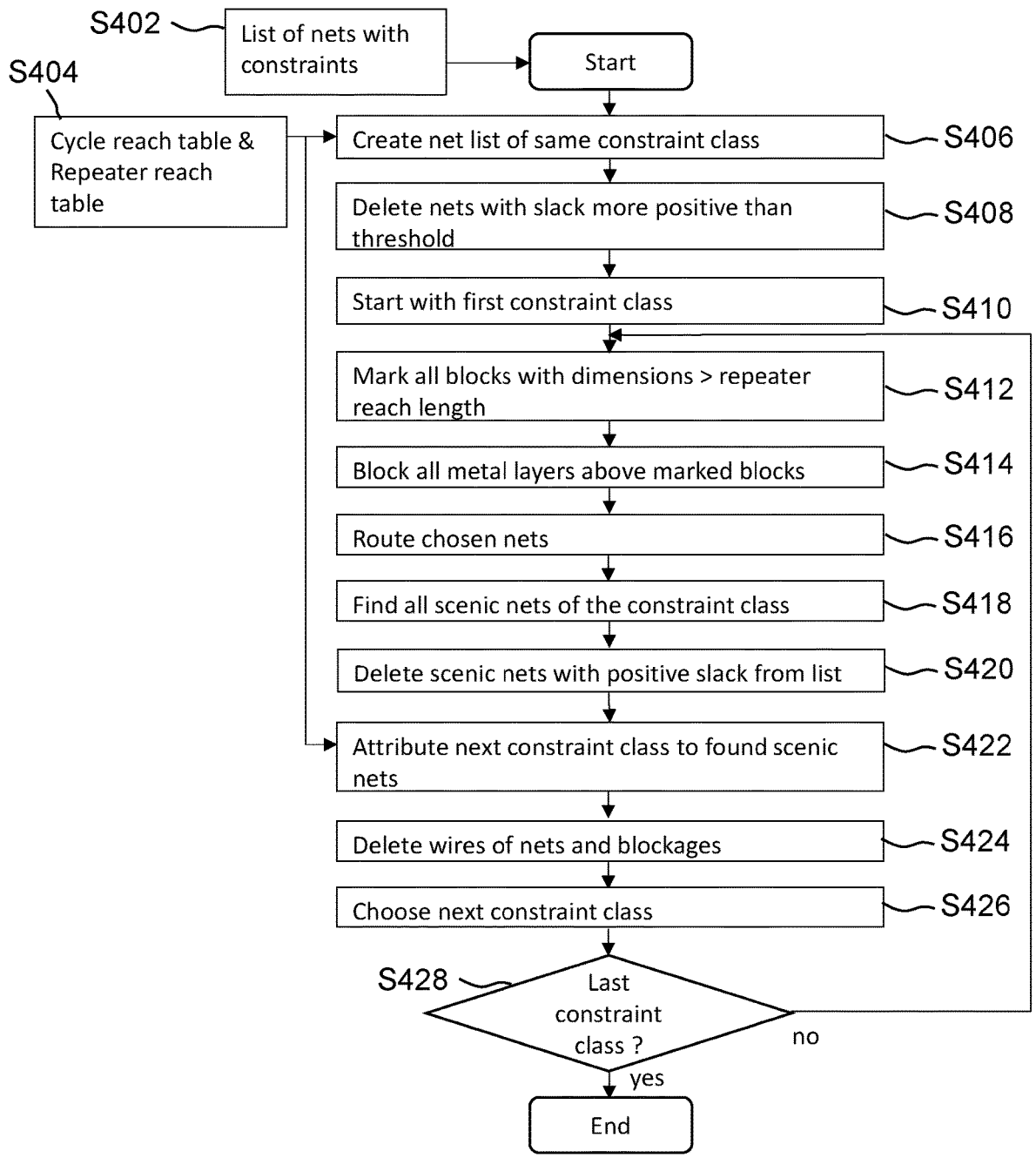
FIG. 10 depicts a flowchart of the method with taking into account of a timing of nets according to a further embodiment of the invention, according to an embodiment.

FIG. 10 depicts a flowchart of the method with taking into account of a timing of nets 10 according to a further embodiment of the invention.

The flowchart in FIG. 10 deals with considering net timing during routing for timing critical nets 10.

Before a wiring is started, all nets 10 that have a positive slack are sorted out. Thus, only timing critical nets 10 are considered. Timing critical nets 10 are distinguished from timing uncritical nets 10 by a threshold value. This can be set at 0 μs, but then the method runs the risk of slightly positive nets becoming negative due to low scenic nets 10. Therefore, this threshold is set slightly positive, e.g. at 10 μs.

Routing of nets 10 may be performed for nets 10 of an actual constraint bucket, and, if the bucket is not the first bucket, of all buckets existing in the list.

The flowchart in FIG. 10 start with the same steps as the flowcharts of the FIGS. 7 to 9 by creating a net list with nets 10 of the same constraint class 32 in step S406.

Next in step S408 nets 10 of the net list with a slack that is more positive than the threshold value are deleted from the net list.

Then the process flow in the steps S410 to S428 follows the process flow of the steps S308 to S328 depicted in FIG. 9.

In step S410 the process starts routing with the first constraint class 32. In step S412 all blocks 14 with dimensions larger than a repeater reach length of the constraint class 32 are marked and in step S414 all metal layers M1, M2, M3, M4, M5, M6, M7, M8 above the marked blocks 14 are blocked.

Then in step S416 the nets 10 are routed.

Next in step S418 all scenic nets 10 of the current constraint class 32 are searched.

Then in step S422 the next constraint class 32 is attributed to the nets 10 of the scenic nets list.

As in the previous flow chart shown in FIG. 9 in step S424 then all wires of all nets 10 and all blockages 64 are deleted and the next constraint class 32 chosen in step S426.

In step S428 it is checked if this was the last constraint class 32. If this is the case the process is ended. If not, the process continues the loop with step S412 by marking the blocks 14.

Figure 11:
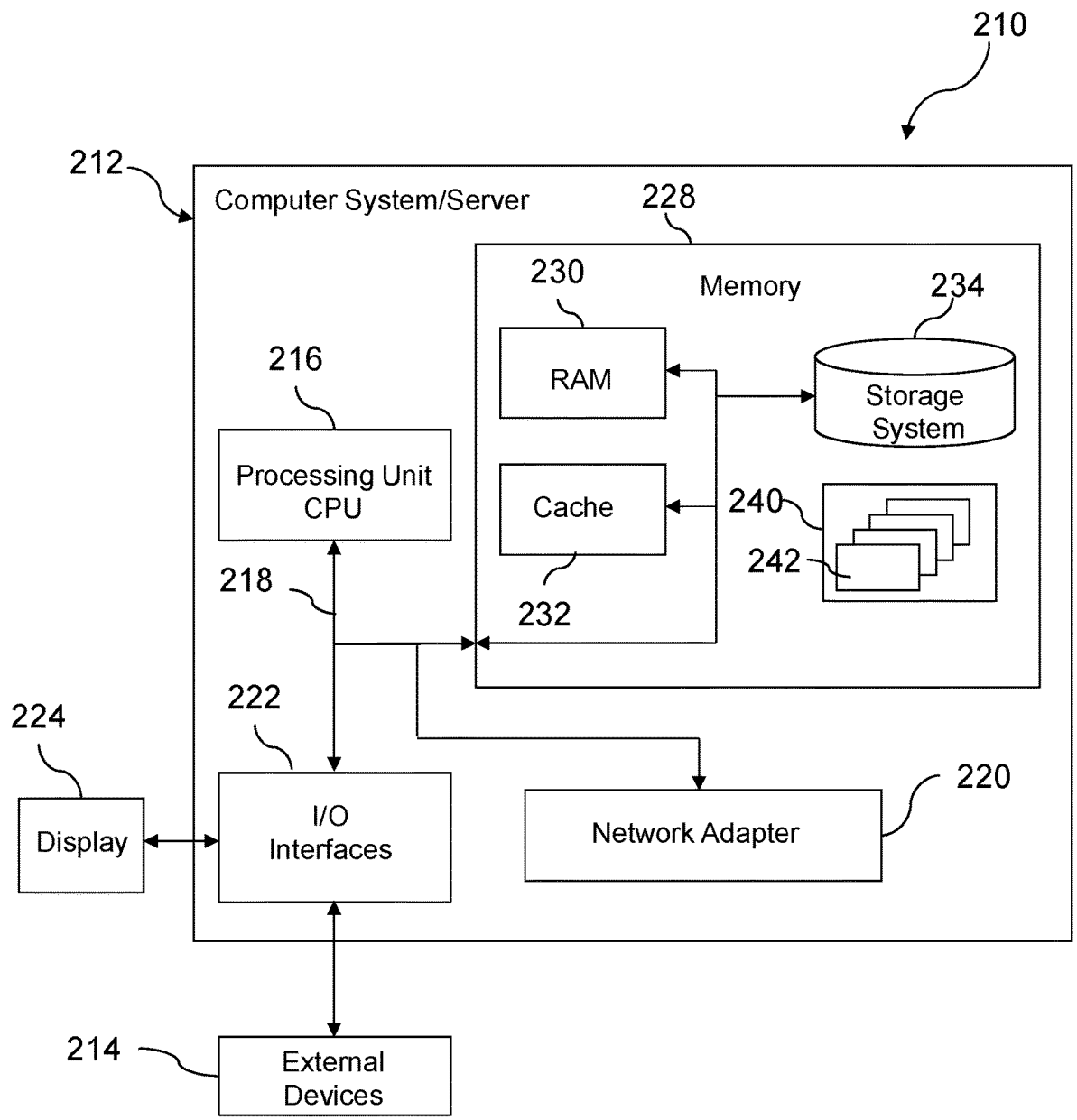
FIG. 11 depicts an example embodiment of a data processing system for executing a method according to the invention.

FIG. 11 depicts a data processing system 210 for a multi-layer integrated circuit routing tool connecting sources of nets 10 to sinks in a hierarchical multi-layer integrated circuit design environment, according to a further embodiment of the invention. The data processing system 210 may at least comprise a memory 228 and a processing unit 216 communicatively coupled to the memory 228. The data processing system 210 may perform a method as described above. In order to avoid unnecessary repetitions it will be referred to the description of the method explained with FIGS. 1 to 10.

Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processing unit 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further exemplary embodiments of the present disclosure are set out in the following numbered clauses:

Numbered clause 1: A computer implemented method for a multi-layer integrated circuit routing tool connecting sources with nets (10) to sinks in a hierarchical multi-layer integrated circuit design environment, the method at least comprising:
creating a cycle reach table (20) containing a first set of information parameters for two dimensional nets (10) per metal layer combination (22);
creating a repeater reach table (30) containing a second set of information parameters per constraint class (32);
preparing a working list of nets (10) by
creating a list of nets (10) with the same constraint class (32);
starting with the first constraint class (32) corresponding to a lowest metal layer combination (22);
extracting and checking blocked areas (16) in a wiring region (18);
preparing a list of blocks (14) larger than repeater reach dimensions by
marking all blocks (14) wider in length and width than a repeater reach length (36);
creating blockages (64) over these blocks (14) on a metal layer (M1, M2, M3, M4, M5, M6, M7, M8) given by the selected constraint class (32) from the repeater reach table (30) and creating blockages (64) on all higher metal layers (M1, M2, M3, M4, M5, M6, M7, M8) up to the top most metal layer (M8);
connecting a source pin to a sink pin on preassigned metal layers (M1, M2, M3, M4, M5, M6, M7, M8) by routing the net (10) based on the given constraint class (32).

Numbered clause 2: The method according to clause 1, further comprising:
comparing a routed net length with a Steiner net length estimation for all nets (10) being routed around the blockage (64);
calculating a slack on routed nets (10);
removing nets (10) with positive slack from the working list;
removing nets (10) with negative slack and net length similar to the Steiner net length;
removing the new wire solution for nets (10) longer than the Steiner net length as a minimum length after moving them into the next constraint class (32), depending on being part of a category of nets (10) with positive slack;
for nets with net length longer than the Steiner net length requesting an alternate routing solution based on a changed constraint class (32) by either
extending the wire width on the same metal layer (M1, M2, M3, M4, M5, M6, M7, M8) based on the next constraint class (32) from the repeater reach table (30) or
changing to the next constraint class (32) by switching the wiring metal layer (M1, M2, M3, M4, M5, M6, M7, M8) to an upper metal layer (M1, M2, M3, M4, M5, M6, M7, M8),
in order to improve the slack for that net (10);
repeating the above steps for each constraint class (32), in particular in N−1 routing sessions, where N is the number of given constraint classes (32);
collecting the constraint results from each of the N routing sessions;
running the routing sessions in a parallel approach.

Numbered clause 3: The method according to clause 1 or 2, further prioritizing nets (10) of the working list such that nets (10) with a higher complexity will be routed first and nets with a lower complexity will be routed afterwards, in particular wherein the complexity is defined by a number of sink pins in the entire path of the net (10) or by using a wider metal layer width (24).

Numbered clause 4: The method according to any one of clauses 1 to 3, wherein the first set of information parameters for two dimensional wiring per metal layer combination (22) comprises at least:
a metal layer combination (22),
a metal layer width (24),
a specific delay time (28),
wherein the second set of information parameters per constraint class (32) comprises at least:
a constraint class (32),
a metal layer combination (22),
a metal layer width (24) and space (34),
a repeater reach length (36).

Numbered clause 5: The method according to any one of clauses 1 to 4, wherein a necessary space between blocks (14) is determined for placing repeaters (12) and if the space exceeds a predetermined relative threshold part of the nets (10) are assigned to a higher constraint class (32).

Numbered clause 6: The method according to any one of clauses 1 to 5, wherein the routing for different constraint classes (32) is performed in parallel.

Numbered clause 7: The method according to any one of clauses 1 to 6, wherein determining a specific delay time (28) is performed at least by one of a virtual timing model, an estimated timing model, an extraction timing model.

Numbered clause 8: The method according to any one of clauses 1 to 7, further determining a distance of a repeater bay from an edge of the block (14) and comparing this distance with a specific delay time (28).

Numbered clause 9: The method according to any one of clauses 2 to 8, wherein nets (10) with an additional net length for connecting a repeater (12) outside the blockage (64) and a negative slack are assigned to a higher constraint class (32).

Numbered clause 10: The method according to any one of clauses 1 to 9, further, if a block (14) is larger than a repeater reach length (36), the net (10) is assigned to a higher constraint class (32) until a sufficient repeater reach length (36) and/or a positive slack is found.

Numbered clause 11: The method according to any one of clauses 1 to 10, wherein routing of nets (10) is performed for nets (10) of an actual constraint bucket, and, if the bucket is not the first bucket, of all buckets existing in the list.

Numbered clause 12: A data processing system (210) for a multi-layer integrated circuit routing tool connecting sources with nets (10) to sinks in a hierarchical multi-layer integrated circuit design environment, the system (210) at least comprising:
  a memory (228); and
  a processing unit (216) communicatively coupled to the memory (228),
wherein the data processing system (210) performs a method at least comprising:
  creating a cycle reach table (20) containing a first set of information parameters for two dimensional nets (10) per metal layer combination (22);
  creating a repeater reach table (30) containing a second set of information parameters per constraint class (32);
  preparing a working list of nets (10) by
    creating a list of nets (10) with the same constraint class (32);
    starting with the first constraint class (32) corresponding to a lowest metal layer combination (22);
    extracting and checking blocked areas (16) in a wiring region (18);
  preparing a list of blocks (14) larger than repeater reach dimensions by
    marking all blocks (14) wider in length and width than a repeater reach length (36);
    creating blockages (64) over these blocks (14) on a metal layer (M1, M2, M3, M4, M5, M6, M7, M8) given by the selected constraint class (32) from the repeater reach table (30) and creating blockages (64) on all higher metal layers (M1, M2, M3, M4, M5, M6, M7, M8) up to the top most metal layer (M8);
  connecting a source pin to a sink pin on preassigned metal layers (M1, M2, M3, M4, M5, M6, M7, M8) by routing the net (10) based on the given constraint class (32).

Numbered clause 13: The system according to clause 12, further comprising:
  comparing a routed net length with a Steiner net length estimation for all nets (10) being routed around the blockage (64);
  calculating a slack on routed nets (10);
  removing nets (10) with positive slack from the working list;
  removing nets (10) with negative slack and net length similar to the Steiner net length;
  removing the new wire solution for nets (10) longer than the Steiner net length as a minimum length after moving them into the next constraint class (32), depending on being part of a category of nets (10) with positive slack;
  for nets with net length longer than the Steiner net length requesting an alternate routing solution based on a changed constraint class (32) by either
    extending the wire width on the same metal layer (M1, M2, M3, M4, M5, M6, M7, M8) based on the next constraint class (32) from the repeater reach table (30) or
    changing to the next constraint class (32) by switching the wiring metal layer (M1, M2, M3, M4, M5, M6, M7, M8) to an upper metal layer (M1, M2, M3, M4, M5, M6, M7, M8),
  in order to improve the slack for that net (10);
  repeating the above steps for each constraint class (32), in particular in N−1 routing sessions, where N is the number of given constraint classes (32);
  collecting the constraint results from each of the N routing sessions;
  running the routing sessions in a parallel approach.

Numbered clause 14: The system according to clause 12 or 13, further prioritizing nets (10) of the working list such that nets (10) with a higher complexity will be routed first and nets with a lower complexity will be routed afterwards, wherein the complexity, in particular, is defined by a number of sink pins in the entire path of the net (10) or using a wider wire width or space (34).

Numbered clause 15: The system according to any one of clauses 12 to 14, wherein the first set of information parameters for two dimensional wiring per metal layer combination (22) comprises at least:
  a metal layer combination (22),
  a metal layer width (24),
  a specific delay time (28),
  wherein the second set of information parameters per constraint class (32) comprises at least:
    a constraint class (32),
    a metal layer combination (22),
    a metal layer width (24) and space (34),
    a repeater reach length (36).

Numbered clause 16: The system according to any one of clauses 12 to 15, wherein a necessary space between blocks (14) is determined for placing repeaters (12) and if the space exceeds a predetermined relative threshold part of the nets (10) are assigned to a higher constraint class (32).

Numbered clause 17: The system according to any one of clauses 12 to 16, wherein the routing for different constraint classes (32) is performed in parallel.

Numbered clause 18: The system according to any one of clauses 12 to 17, wherein determining a repeater reach timing is performed at least by one of a virtual timing model, an estimated timing model, an extraction timing model.

Numbered clause 19: The system according to any one of clauses 12 to 18, further determining a distance of a repeater bay from an edge of the block (14) and comparing this distance with a repeater reach timing.

Numbered clause 20: The system according to any one of clauses 13 to 19, wherein nets (10) with an additional net length for connecting a repeater (12) outside the blockage (64) and a negative slack are assigned to a higher constraint class (32).

Numbered clause 21: The system according to any one of clauses 12 to 20, further, if a block (14) is larger than a repeater reach length (36), the net (10) is assigned to a higher constraint class (32) until a sufficient repeater reach length (36) and/or a positive slack is found.

Numbered clause 22: The system according to any one of clauses 12 to 21, wherein routing of nets (10) is performed for nets (10) of an actual constraint bucket, and, if the bucket is not the first bucket, of all buckets existing in the list.

Numbered clause 23: A computer program product for a multi-layer integrated circuit routing tool connecting sources with nets (10) to sinks in a hierarchical multi-layer integrated circuit design environment, the computer program product comprising a computer readable storage medium having program instructions embodied therewith, the program instructions executable by the computer system (212) to cause the computer system (212) to perform a method comprising:
  creating a cycle reach table (20) containing a first set of information parameters for two dimensional nets (10) per metal layer combination (22);
  creating a repeater reach table (30) containing a second set of information parameters per constraint class (32);
  preparing a working list of nets (10) by
    creating a list of nets (10) with the same constraint class (32);

starting with the first constraint class (32) corresponding to a lowest metal layer combination (22);
extracting and checking blocked areas (16) in a wiring region (18);
preparing a list of blocks (14) larger than repeater reach dimensions by
marking all blocks (14) wider in length and width than a repeater reach length (36);
creating blockages (64) over these blocks (14) on a metal layer (M1, M2, M3, M4, M5, M6, M7, M8) given by the selected constraint class (32) from the repeater reach table (30) and creating blockages (64) on all higher metal layers (M1, M2, M3, M4, M5, M6, M7, M8) up to the top most metal layer (M8);
connecting a source pin to a sink pin on preassigned metal layers (M1, M2, M3, M4, M5, M6, M7, M8) by routing the net (10) based on the given constraint class (32).

Numbered clause 24: A data processing system (210) for execution of a data processing program (240) comprising computer readable program instructions for performing a method according to any one of clauses 1 to 11.

What is claimed is:

1. A computer implemented method for a multi-layer integrated circuit routing tool connecting sources with nets to sinks in a hierarchical multi-layer integrated circuit design environment, the method comprising:
creating a cycle reach table comprising a first set of information parameters for two dimensional nets per metal layer combination;
creating a repeater reach table comprising a second set of information parameters per constraint class;
preparing a working list of nets by creating a list of nets with a same constraint class, starting with a first constraint class corresponding to a lowest metal layer combination, and extracting and checking blocked areas in a wiring region;
preparing a list of blocks larger than repeater reach dimensions by marking all blocks wider in length and width than a repeater reach length and creating blockages over these blocks on a metal layer given by a selected constraint class from the repeater reach table and creating blockages on higher metal layers up to a top most metal layer, wherein the metal layers comprise M1, M2, M3, M4, M5, M6, M7, M8, wherein M8 is the top most metal layer; and
connecting a source pin to a sink pin on preassigned metal layers by routing a net based on the given constraint class.

2. The method according to claim 1, further comprising:
comparing a routed net length with a Steiner net length estimation for a net being routed around a blockage;
calculating a slack on routed nets;
removing nets with positive slack from the working list;
removing nets with negative slack and net length similar to the Steiner net length;
removing a new wire solution for a net longer than the Steiner net length as a minimum length after moving them into a next constraint class, depending on being part of a category of nets with positive slack;
for nets with net length longer than the Steiner net length, requesting an alternate routing solution based on a changed constraint class by:
extending a wire width on a same metal layer based on the next constraint class from the repeater reach table or changing to the next constraint class by switching the wiring metal layer to an upper metal layer, in order to improve the slack for a net;
repeating the above steps for each constraint class, in particular in N−1 routing sessions, where N is the number of given constraint classes;
collecting constraint results from each of the N routing sessions; and
running the N routing sessions in a parallel approach.

3. The method according to claim 1, further comprising:
prioritizing nets of the working list such that nets with a higher complexity will be routed first and nets with a lower complexity will be routed afterwards, in particular wherein complexity is defined by a number of sink pins in the entire path of the net or by using a wider metal layer width.

4. The method according to claim 1, wherein
the first set of information parameters for two dimensional wiring per metal layer combination comprises:
a metal layer combination, a metal layer width and a specific delay time, wherein
the second set of information parameters per constraint class comprises the constraint class, a metal layer combination, a metal layer width and space, the repeater reach length.

5. The method according to claim 1, wherein
a necessary space between blocks is determined for placing repeaters, and if the space exceeds a predetermined relative threshold, part of the nets are assigned to a higher constraint class.

6. The method according to claim 1, wherein
the routing for different constraint classes is performed in parallel.

7. The method according to claim 1, wherein
determining a specific delay time is performed at least by one of a virtual timing model, an estimated timing model, and an extraction timing model.

8. The method according to claim 1, further comprising:
determining a distance of a repeater bay from an edge of the block and comparing this distance with a specific delay time.

9. The method according to claim 2, wherein
nets with an additional net length for connecting a repeater outside the blockage and a negative slack are assigned to a higher constraint class.

10. The method according to claim 1, further comprising:
when a block is larger than a repeater reach length, the net is assigned to a higher constraint class until a sufficient repeater reach length and/or a positive slack is found.

11. The method according to claim 1, wherein
routing of nets is performed for nets of an actual constraint bucket, and, when the bucket is not a first bucket, of all buckets existing in the working list.

12. A computer system for a multi-layer integrated circuit routing tool connecting sources with nets to sinks in a hierarchical multi-layer integrated circuit design environment, the computer system comprising:
one or more computer processors, one or more computer-readable storage media, and program instructions stored on the one or more of the computer-readable storage media for execution by at least one of the one or more processors, wherein the computer system is capable of performing a method comprising:
creating a cycle reach table comprising a first set of information parameters for two dimensional nets per metal layer combination;
creating a repeater reach table comprising a second set of information parameters per constraint class;
preparing a working list of nets by creating a list of nets with a same constraint class, starting with a first constraint class corresponding to a lowest metal layer combination, and extracting and checking blocked areas in a wiring region;

preparing a list of blocks larger than repeater reach dimensions by marking all blocks wider in length and width than a repeater reach length and creating blockages over these blocks on a metal layer given by a selected constraint class from the repeater reach table and creating blockages on higher metal layers up to a top most metal layer, wherein the metal layers comprise M1, M2, M3, M4, M5, M6, M7, M8, wherein M8 is the top most metal layer; and connecting a source pin to a sink pin on preassigned metal layers by routing a net based on the given constraint class.

13. The computer system according to claim 12, further comprising:

comparing a routed net length with a Steiner net length estimation for all nets being routed around a blockage;

calculating a slack on routed nets;

removing nets with positive slack from the working list;

removing nets with negative slack and net length similar to the Steiner net length;

removing a new wire solution for nets longer than the Steiner net length as a minimum length after moving them into a next constraint class, depending on being part of a category of nets with positive slack;

for nets with net length longer than the Steiner net length, requesting an alternate routing solution based on a changed constraint class by either:

extending the wire width on a same metal layer based on the next constraint class from the repeater reach table or changing to the next constraint class by switching the wiring metal layer to an upper metal layer, in order to improve the slack for a net;

repeating the above steps for each constraint class, in particular in N−1 routing sessions, where N is the number of given constraint classes;

collecting constraint results from each of the N routing sessions; and running the N routing sessions in a parallel approach.

14. The computer system according to claim 12, further comprising:

prioritizing nets of the working list such that nets with a higher complexity will be routed first and nets with a lower complexity will be routed afterwards, in particular wherein complexity is defined by a number of sink pins in the entire path of the net or by using a wider metal layer width.

15. The computer system according to claim 12, wherein the first set of information parameters for two-dimensional wiring per metal layer combination comprises:

a metal layer combination, a metal layer width and a specific delay time, wherein the second set of information parameters per constraint class comprises a constraint class, a metal layer combination, a metal layer width and space, a repeater reach length.

16. The computer system according to claim 12, wherein a necessary space between blocks is determined for placing repeaters, and if the space exceeds a predetermined relative threshold, part of the nets are assigned to a higher constraint class.

17. The computer system according to claim 12, wherein the routing for different constraint classes is performed in parallel.

18. The computer system according to claim 12, wherein determining a specific delay time is performed at least by one of a virtual timing model, an estimated timing model, and an extraction timing model.

19. The computer system according to claim 12, further comprising:

determining a distance of a repeater bay from an edge of the block and comparing this distance with a specific delay time.

20. The computer system according to claim 13, wherein nets with an additional net length for connecting a repeater outside the blockage and a negative slack are assigned to a higher constraint class.

21. The computer system according to claim 12, further comprising:

when a block is larger than a repeater reach length, the net is assigned to a higher constraint class until a sufficient repeater reach length and/or a positive slack is found.

22. The computer system according to claim 12, wherein routing of nets is performed for nets of an actual constraint bucket, and, when the bucket is not a first bucket, of all buckets existing in the working list.

23. A computer program product for a multi-layer integrated circuit routing tool connecting sources with nets to sinks in a hierarchical multi-layer integrated circuit design environment, the computer program product comprising:

one or more computer-readable storage media and program instructions stored on the one or more computer-readable storage media, the program instructions executable by a computing system to cause the computing system to perform a method comprising:

creating a cycle reach table comprising a first set of information parameters for two dimensional nets per metal layer combination;

creating a repeater reach table comprising a second set of information parameters per constraint class;

preparing a working list of nets by creating a list of nets with a same constraint class, starting with a first constraint class corresponding to a lowest metal layer combination, and extracting and checking blocked areas in a wiring region;

preparing a list of blocks larger than repeater reach dimensions by marking all blocks wider in length and width than a repeater reach length and creating blockages over these blocks on a metal layer given by a selected constraint class from the repeater reach table and creating blockages on higher metal layers up to a top most metal layer, wherein the metal layers comprise M1, M2, M3, M4, M5, M6, M7, M8, wherein M8 is the top most metal layer; and connecting a source pin to a sink pin on preassigned metal layers by routing a net based on the given constraint class.

* * * * *